April 28, 1931.  J. SEKAVEC  1,802,541
LAUNDRY MACHINE
Filed Aug. 8, 1929   2 Sheets-Sheet 1
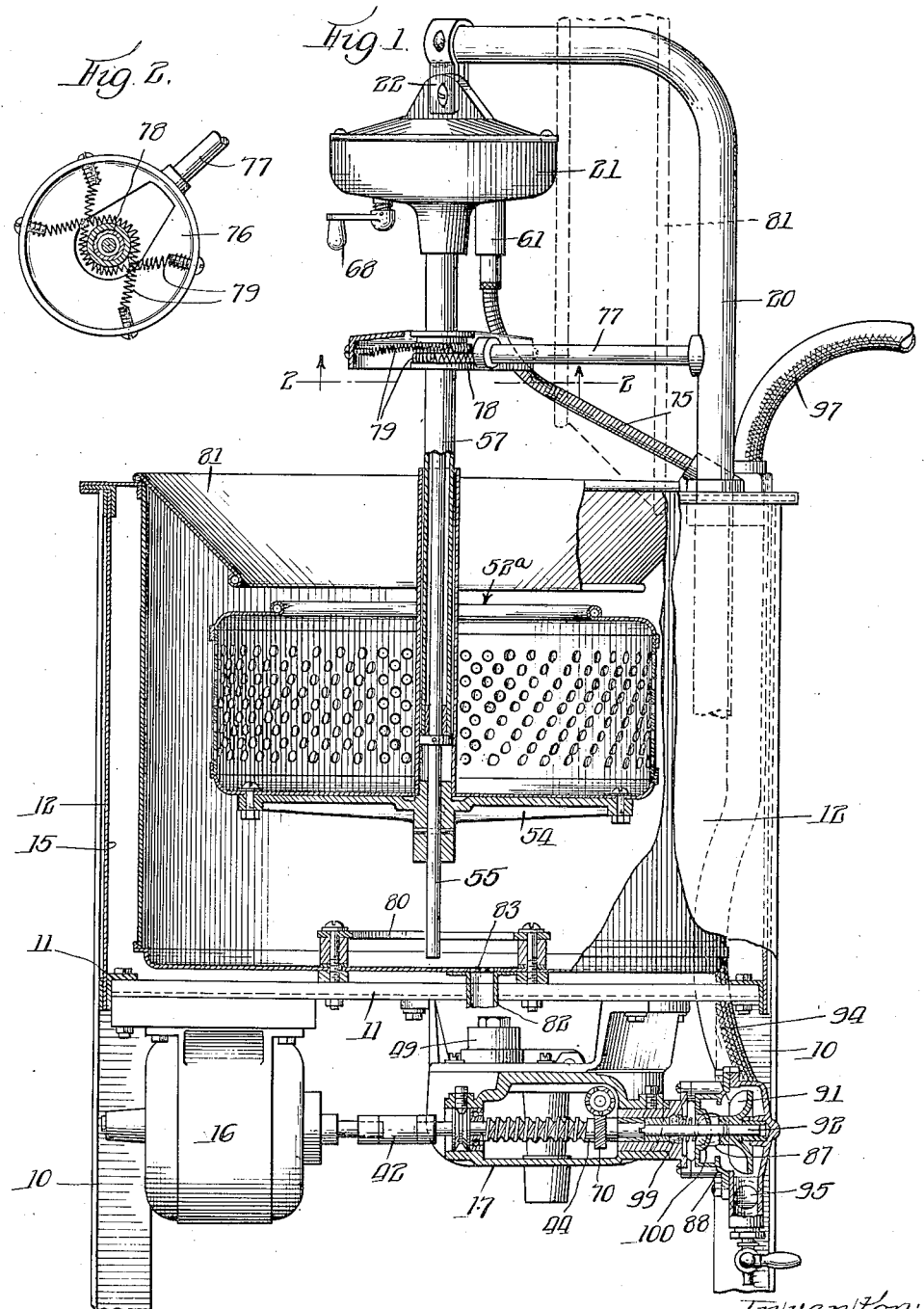

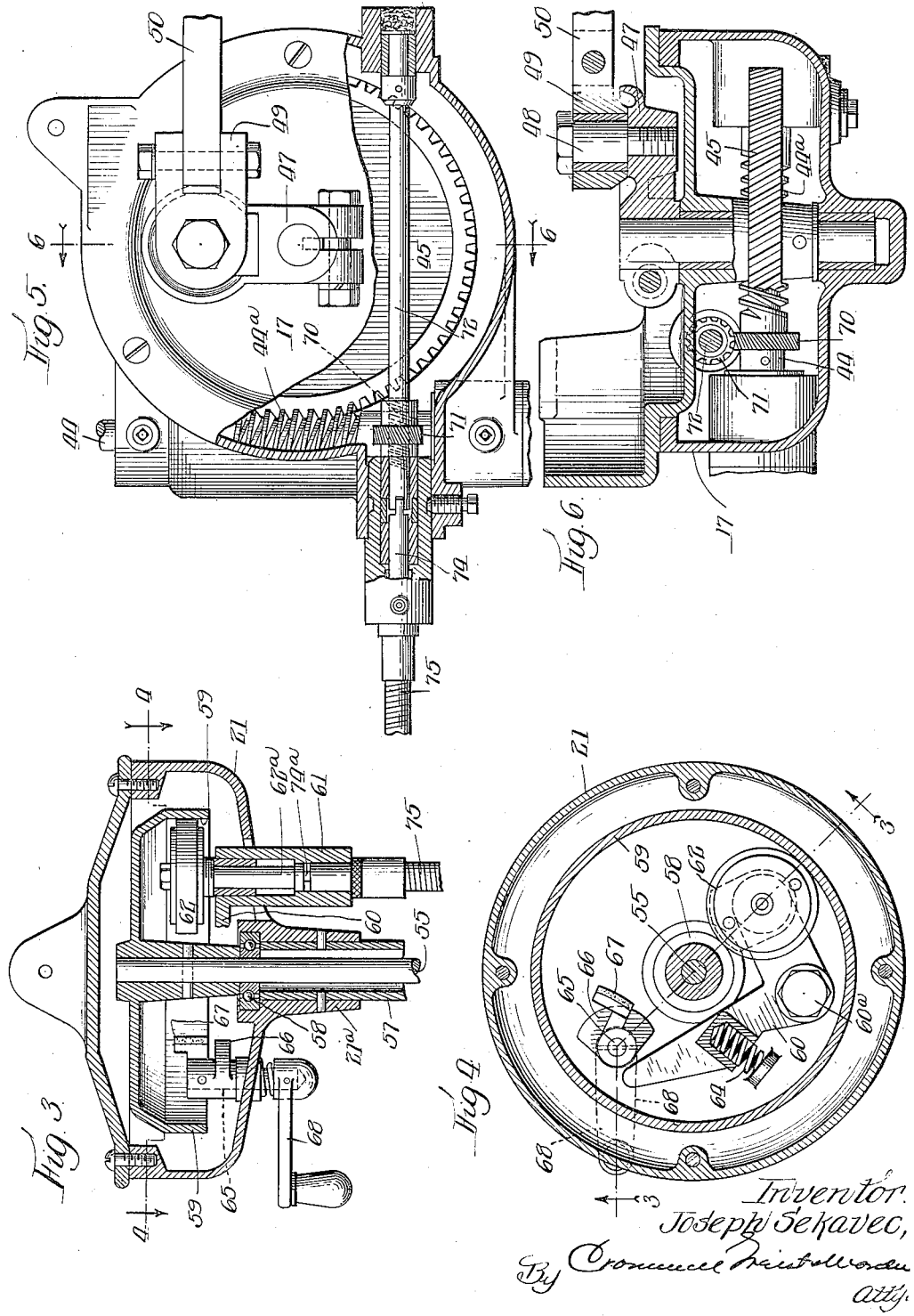

Patented Apr. 28, 1931

1,802,541

UNITED STATES PATENT OFFICE

JOSEPH SEKAVEC, OF CHICAGO, ILLINOIS, ASSIGNOR TO TRIPLEX WASHING MACHINE CORPORATION, OF CHICAGO, ILLINOIS, A CORPORATION OF ILLINOIS

LAUNDRY MACHINE

Original application filed November 25, 1927, Serial No. 235,474, and in Canada November 25, 1927. Divided and this application filed August 8, 1929. Serial No. 384,259.

This invention relates to a power operated laundry machine of a type having features whereby it is particularly adapted to domestic use, and the present application, which is a division of my copending application Serial No. 235,474, filed November 25, 1927, is directed particularly to the portions and features of the machine constituting the water extracting apparatus.

A general object of the invention is the provision of a centrifugal extracting apparatus which may be combined conveniently with washing apparatus to constitute a compact, self-contained, portable laundry machine which is of strong and simple construction and certain and safe in operation.

A particular object of the invention is the provision of a centrifugal extracting device which may be embodied in a comparatively small and light portable machine and which will be free from excessive vibration and rapid wear, and at the same time be highly efficient from the standpoint of convenience as well as from the standpoint of output capacity.

Another object is the provision of an extracting device having the attributes mentioned above and in which the handled material may be subjected to rinsing in a convenient manner concurrently with the operation whereby water is extracted from it by centrifugal action.

Other and further objects will be pointed out or indicated hereinafter or will be apparent to one skilled in the art upon an understanding of the invention or its employment in practice.

In the accompanying drawings forming part of this specification I illustrate an embodiment of the invention, including details of various of its features, but it is to be understood that these illustrations are here presented by way of example only; and are not to be accorded any interpretation calculated to limit the claims short of the true and most comprehensive scope of the invention in the art.

In said drawings,

Fig. 1 is an elevational view, for the most part in section, illustrating the general organization of the machine and certain of the parts in detail;

Fig. 2 is a sectional view on approximately line 2—2 of Fig. 1, showing the extractor centering device in bottom plan view;

Fig. 3 is a sectional elevation of the extractor drive housing and driving mechanism, same corresponding to a section on approximately line 3—3 of Fig. 4;

Fig. 4 is a cross sectional view of the extractor drive mechanism such as taken on approximately line 4—4 of Fig. 3;

Fig. 5 is a top view, partly in plan and partly in section, of the power distributing mechanism; and Fig. 6 is a sectional elevation of same on approximately line 6—6 of Fig. 5.

The subject matter of the present invention is adapted particularly for combination in a unitary machine with washing mechanism as disclosed in the parent application identified above, which machine comprises collaterally disposed receptacles, one for washing and the other for extracting, which are carried on a frame with their tops approximately at the same level, the operating parts of both being actuated by suitable driving mechanism which is carried on the frame below the receptacles. The legs of the frame are designated by the reference numeral 10, and longitudinal and transverse frame members by the reference numerals 11. The reference numerals 12 designate sheathing plates which are carried on the frame and form a rectangular housing for the washing and extracting receptacles, the latter of which is designated by the reference numeral 15, and is of generally cylindrical form and open at the top. On various of the frame members below the receptacles are mounted a driving motor 16 and gear housing 17. The frame also supports a standard 20, which is deflected horizontally at an appropriate elevation over the top of the receptacle 15 to afford a means of support for the extractor drive housing 21, which is suspended thereon by means of a flexible connection 22 which permits the drive housing a desired degree of pivotal or swivel movement. The extractor cage 52, which has a top opening 52ª and perforated cylindrical side wall, is carried on a spider frame 54 that is secured to the extractor shaft 55. This shaft passes through a guard tube 56 on the axis of the cage, and through a guide tube 57 that is fitted telescopically within the guard tube and secured at its upper end in a sleeve 21ª on the extractor drive housing. The guard tube 56 is secured at its lower end to a bushing on the spider 54. The extractor shaft 55 extends above the upper end of the guide tube 57, and is rotatably supported on the drive housing by a roller bearing 58. Connected to the upper end of the extractor shaft 55 is a transmission drum 59 of circular contour, affording a circular interior friction-drive surface. Pivoted on the housing 21 at 60ª is the friction-drive wheel lever 60, which carries at the ends of one of its arms a bearing sleeve 61 in which is journaled the shaft 62ª of the friction-drive wheel 62. The friction-drive wheel is adapted for peripheral driving engagement with the circular drive face of the drum 59. A spring 64 cooperates with the other arm of lever 60 with the tendency to press the drive wheel 62 into driving contact with the drum 59. Journaled on the housing 21 in association with the tail of lever 60 is a shaft 65 which carries a cam 66 adapted for cooperation with the tail of said lever, and a brake shoe 67 adapted for cooperation with the drum 59. The shaft 65 may be rotated by a crank 68 to render the cam 66 effective on the lever 60 and thus swing the drive wheel 62 out of engagement with the drum 59, and upon further movement of the crank 68 in a direction indicated by the arrow in Fig. 4, the brake shoe 67 will be brought into engagement with the drum 59 to exert braking friction on the same.

The gear housing 17 has journaled therein a worm shaft 44 which is connected with the rotor shaft of the motor 16 by flexible driving connection 42. The worm 44ª of said worm shaft meshes with a pinion 45 which, through the medium of the suitable driving connections 47, 48, 49 and 50, is adapted to drive the associated washing mechanism. The worm shaft 44 carries also a helical gear 70 which meshes with helical gear 71 carried on a shaft 72 which is journaled in the casing and has driving connection at one end with the coupling 74 and a flexible shaft which extends through the flexible sheathing 75 up to the drive housing 21, where the other end 74ª of said flexible shaft has driving connection with the shaft 62ª of the friction-drive wheel. Thus, with rotation of the worm shaft 44 by the motor 16, rotation will be imparted to the friction-drive wheel 62, and to the drum 59, extractor shaft 55 and extractor cage 52, when the friction-drive wheel 62 is in driving engagement with the drum. The rotation thus imparted to the extractor cage 52 is a rapid rotation in a single direction, and by virtue of this operation, water held in material, such as fabrics, which is deposited within the cage 52, is thrown out through the perforations of the cage and caught in the receptacle 15. Due to the pivotal suspension of the drive housing 21 and the freedom of the lower end of the extractor shaft 55, the cage is free to swing in any direction and assume a gyratory movement, such as it is inclined to do when its loading is not equally distributed, without imparting objectionable vibration to the machine frame. To constrain the extractor shaft to a central or vertical position, while allowing this desired freedom of oscillatory or gyratory movement, I provide a flexible centering device such as that illustrated in Figs. 1 and 2. This comprises a flanged member 76 carried on an arm 77 extending from the support 20, and affording an aperture accommodating the passage of the guide tube 57 with an appropriate clearance. The flanged collar 78 is secured to the guide tube, and coiled springs 79 are arranged to clasp the collar, said springs being secured at their ends to the flange of the member 76 and held under tension in such fashion that their lateral pressures upon the collar tend to constrain the tube 57 to its central or vertical position. To guard the receptacle 15 and the cage 52 against impact, a guard ring 80 is disposed in encircling relationship to the lower end of the shaft 55 and firmly anchored to frame members 11. The internal diameter of this guard ring is sufficient to allow the extractor shaft and cage a liberal eccentric play, but to limit their eccentric movement short of extent which would permit the cage contacting the wall of the receptacle.

At the top of the receptacle 15 is disposed a removable splash ring or apron 81 of downwardly tapering conical contour, which rests at its upper beaded edge upon the mouth of the receptacle, and at its lower edge terminates about the opening 52ª above the imperforate top ring or cowl of the cage 52. This apron or splash ring functions not only as a guide for the introduction of the material into the top opening of the cage, but also catches any splash from the cage and wall of the receptacle 15, preventing the water from being thrown back into the cage and guiding it so that it will drip onto the imperforate cowl of the latter, whence it is thrown off by centrifugal action. This splash ring may be turned up to the position illustrated in dotted lines, to permit access to the interior of the receptacle 15 about the cage. The receptacle 15 has a screened drainage outlet 83 which communicates with an outlet pipe 82 leading to the inlet of the pump housing 88, which pump housing is mounted as an extension on the gear housing 17. The impeller 91 of the pump is carried on a shaft 92 which has driving connection with the worm shaft 44, so that the pump is operated concurrently with the operation of the extractor, thus serving to keep the receptacle 15 continuously clear of accumulated water, and thus safeguard the material in the cage against rewetting. The outlet 95 of the pump casing is connected with a conduit 94, which leads up through frame to an extension 97, flexibly mounted, so that the discharge from the pump may be directed to the associated washing receptacle or to an external repository. The chamber of the pump housing is separated from the gear housing, and the impeller shaft is packed with a tight gland 99—100 so that there is no possibility of lubricant finding its way from the gear housing into the pump chamber.

In operation, the motor 16 being running, the cage may be brought to rest by turning the crank 68 so as first to cam the wheel 62 away from the drum 59, and then bring the brake shoe 67 against the drum. The cage may be then charged through the top opening, and the crank 68 manipulated to restore the driving connection of the wheel 62 and drum 59. Thereupon the cage will be given a rapid rotation and the water thrown out of the material by centrifugal force. Incident to the rotation of the cage, particularly upon starting with an unbalanced loading, it may tend to take a gyratory movement, which movement is accommodated by its flexible suspension and the flexible centering springs 79. An important advantage of the apparatus resides in the fact that the material in the cage may be sprayed with rinse water through the top opening while the cage is rotated, thus precluding the necessity of any rinsing between the removal of the material from the washer and its being deposited in the extractor. The machine may be mounted on castors attached to the legs 10, so that it can be easily rolled from place to place, but in spite of its ready mobility, it is free of objectionable vibration due to the construction and organization of the operating parts. It will be observed that the low mounting of the heavier operating parts, such as the motor and transmission gearing, gives the machine a low center of gravity, while the pivotal suspension of the cage effectively prevents the transmission of vibration to the elevated portion.

What I claim is:

1. In a laundry machine, in combination, a frame, a standard rigidly supported thereon adjacent one side thereof and extending upwardly and inwardly of the frame, a shaft having swivel connection at its upper end with said standard and depending therefrom for swinging and rotary movement, a stop ring rigidly connected to the frame and encompassing the lower end of said shaft but spaced therefrom, actuating means mounted on the frame below and adjacent said stop ring, a flexible drive shaft and transmission means operably connecting said actuating means with the upper end of said shaft, and an extractor cage carried by said shaft for gyratory movement above said stop ring, said transmission means having a fixed relationship with respect to the first mentioned shaft irrespective of the angular position of the same.

2. In a laundry machine, in combination, a mobile frame, a receptacle mounted thereon and having a top opening, a standard mounted on the frame and extending part way upwardly alongside the receptacle and part way over the same, a drive shaft extending upwardly alongside the receptacle and having a flexible portion extending part way over the same, an extractor shaft having swivel connection with the standard above the receptacle and depending in the latter, an extractor cage carried by the extractor shaft within the receptacle, actuating means mounted on the frame below the receptacle and having driving connection with the lower end of said drive shaft, and a driving connection between the upper ends of the drive shaft and extractor shaft.

3. In a laundry machine, in combination, a mobile frame having supporting legs and a standard overhanging a portion of the area therebetween, actuating mechanism mounted on said frame in the area between the legs, an extractor shaft having swivel mounting on said standard and depending therefrom for swinging the rotary movement, an extractor cage carried by said shaft for gyratory movement in a zone below said swivel mounting and above said actuating mechanism, and transmission means including a flexible drive shaft operably connecting said actuating mechanism with the upper end of the extractor shaft.

In testimony whereof I have hereunto subscribed my name.

JOSEPH SEKAVEC.

CERTIFICATE OF CORRECTION.

Patent No. 1,802,541.  Granted April 28, 1931, to

JOSEPH SEKAVEC.

It is hereby certified that error appears in the printed specification of the above numbered patent requiring correction as follows: Page 3, line 97, claim 3, for the article "the" read and; and that the said Letters Patent should be read with this correction therein that the same may conform to the record of the case in the Patent Office.

Signed and sealed this 2nd day of June, A. D. 1931.

(Seal)

M. J. Moore,
Acting Commissioner of Patents.